(12) United States Patent
Wong et al.

(10) Patent No.: US 12,130,436 B2
(45) Date of Patent: Oct. 29, 2024

(54) OPTICAL SYSTEM

(71) Applicant: 3M INNOVATIVE PROPERTIES COMPANY, St. Paul, MN (US)

(72) Inventors: Timothy L. Wong, West Saint Paul, MN (US); Timothy J. Lindquist, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 547 days.

(21) Appl. No.: 17/594,449

(22) PCT Filed: Apr. 28, 2020

(86) PCT No.: PCT/IB2020/053989
§ 371 (c)(1),
(2) Date: Oct. 15, 2021

(87) PCT Pub. No.: WO2020/225650
PCT Pub. Date: Nov. 12, 2020

(65) Prior Publication Data
US 2022/0187606 A1    Jun. 16, 2022

Related U.S. Application Data

(60) Provisional application No. 62/842,931, filed on May 3, 2019.

(51) Int. Cl.
*G02B 27/01* (2006.01)
*G02B 27/28* (2006.01)

(52) U.S. Cl.
CPC ......... *G02B 27/0172* (2013.01); *G02B 27/28* (2013.01)

(58) Field of Classification Search
CPC ..... G02B 27/00–648; G02B 2027/0105–0198; G03B 21/00–64
See application file for complete search history.

(56) References Cited

U.S. PATENT DOCUMENTS

| 6,011,653 A | 1/2000 | Karasawa | |
| 2018/0341109 A1* | 11/2018 | Lin | G02B 27/01 |
| 2023/0176381 A1* | 6/2023 | Diao | G02B 27/286 |
| | | | 359/483.01 |

FOREIGN PATENT DOCUMENTS

| JP | 61176525 | 11/1986 |
| JP | 2008046562 | 2/2008 |

(Continued)

OTHER PUBLICATIONS

Hainich, "Approaches[1] To Ideal Freeform Mirror And Display Shapes For Augmented Reality", The End of Hardware, 2014, [retrieved from the internet on Dec. 14, 2021], URL <http://www.theendofhardware.com/freeform-NED.html>, 2014, p. 1.

(Continued)

*Primary Examiner* — Bao-Luan Q Le
*Assistant Examiner* — Christopher A Lamb, II
(74) *Attorney, Agent, or Firm* — Robert S. Moshrefzadeh

(57) ABSTRACT

An optical system (200) that allows a viewer (10) to simultaneously see images created by an electronic display (20) as well as real world objects (30b) includes a reflective polarizer (41) as an image combiner for head-mounted displays and an absorptive polarizer (42) deployed in the same combiner to reduce glare by minimizing ambient reflections from the reflective polarizer. To prevent the absorptive polarizer (42) from blocking linearly polarized light sources from being transmitted through the combiner, a weak absorptive polarizer is provided to allow transmission of polarized sources while still minimizing glare.

15 Claims, 5 Drawing Sheets

(56) References Cited

FOREIGN PATENT DOCUMENTS

| | | |
|---|---|---|
| JP | 2009157210 | 7/2009 |
| WO | 199936814 W | 7/1999 |
| WO | WO 2000-055676 | 9/2000 |
| WO | 2015157016 A1 | 10/2015 |
| WO | WO 2017-090289 | 6/2017 |
| WO | WO-2017090289 A1 * | 6/2017 |

OTHER PUBLICATIONS

International Search Report for PCT International Application No. PCT/IB2020/053989, mailed on Jul. 28, 2020, 4 pages.

* cited by examiner

OPTICAL SYSTEM

TECHNICAL FIELD

The disclosure generally relates to optical systems and see-through optical systems for displaying images.

BACKGROUND

Optical systems may be included in head-mounted displays (HMD) to provide images to a viewer. The optical system may include a display panel and various optical components between the display panel and an eye of the viewer.

SUMMARY

Various aspects and embodiments described herein relate to an optical system having folded optical path.

Some aspects of the present description relate to an optical system for displaying first and second images to a viewer. The optical system includes different first and second displays and an optical stack. The optical stack is configured to receive a first light ray from the first display and reflect the received first light ray for viewing by the viewer. The optical stack is further configured to receive a second light ray, different than the first light ray, from the second display and transmit the received second light ray for viewing by the viewer. The optical stack includes a reflective polarizer facing the first display, and an absorbing polarizer disposed on the reflective polarizer and facing the second display. Each of the reflective and absorbing polarizers include orthogonal pass and block axes. For substantially normally incident light having a wavelength in a range from about 400 nm to about 700 nm, the reflective polarizer reflects at least 70% of the incident light polarized along the block axis of the reflective polarizer, and transmits at least 70% of the incident light polarized along the pass axis of the reflective polarizer. The absorbing polarizer absorbs at least 50% and at most 85% of the incident light polarized along the block axis of the absorbing polarizer, and transmits at least 70% of the incident light polarized along the pass axis of the absorbing polarizer. The block axes of the reflective and absorbing polarizers make an angle with each other between about 5 degrees to about 40 degrees.

Some other aspects of the disclosure relate to a see-through optical system for displaying a virtual image to a viewer. The system includes a first display configured to emit a first image having a first polarization state, and an optical stack curved along two mutually orthogonal directions. The optical stack is configured to receive the emitted first image and reflect the received first image for viewing by the viewer. The viewer observes a magnified virtual image of the first image, and able to receive and see a polarized real-world object in a real-world scene through the optical stack. For light having at least one wavelength in a predetermined wavelength range and propagating along a substantially normal incident direction, the optical stack reflects at least 70% of the incident light polarized along the first polarization state, and absorbs at least 50% and at most 85% of the incident light having an orthogonal second polarization state. The polarized real-world object remains viewable by the viewer as the optical stack is continuously rotated at least 180 degrees about light incident on the optical stack from the polarized real-world object.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

Optical systems of the present description may be used in head-mounted displays to provide a wide field of view in a compact system having a low profile. In some embodiments, the optical systems include one or more optical lenses, and reflective and absorbing polarizers, each of which may be disposed on or within the one or more lenses, to provide a folded optical path between an image source and the viewer.

Reflective polarizers as an image combiner for head-mounted displays (HMD) with linearly polarized display produce high display efficiency as well as effective transmission of the world view. However, about 50% of ambient light is reflected from the combiner thereby creating glare. For example, to someone looking at the user of the HMD, ambient light would be reflected from the combiner and may make it difficult to view the user's eyes through the combiner. To mitigate the glare, an absorbing polarizer may be integrated into the reflective polarizer combiner to form a "dual polarizer combiner". The absorbing polarizer absorbs the same polarization state of light that would otherwise be reflected by the reflective polarizer in the combiner, thus mitigating glare.

In some cases, the "dual polarizer combiner" may block transmission from polarized sources, e.g., active-matrix liquid crystal displays like TVs, computer monitors, ATMs, kiosks, and the like, and segmented liquid crystal displays used in digital calculators, clocks, watches, instrument panels, and the like. Often times, these polarized displays have polarization orientations of 0, 45, or 90 degrees. To mitigate the issue of the "dual polarizer combiner" blocking transmission from a polarized source, the absorbing polarizer can be rotated to an angle other than one of the above-mentioned three preferred orientations. For example, the absorbing polarizer can be rotated to 15-deg or 35-deg. In this case, light from polarized sources with one of the three preferred orientations will be transmitted by the "dual polarizer combiner".

In some cases where the HMD user rotates their head, the image of the polarized source can still be blocked by the dual polarizer combiner when the absorbing polarizer axis aligns to the polarized source axis.

Optical systems of the present disclosure include a reflective polarizer as an image combiner for head-mounted displays. An absorptive polarizer is deployed in the same combiner system to reduce glare by minimizing ambient reflections from the reflective polarizer. To prevent the absorptive polarizer from blocking linearly polarized light sources like liquid crystal displays from being transmitted through the combiner, a weak absorptive polarizer is provided to allow transmission of polarized sources while still minimizing glare.

Figure 1:
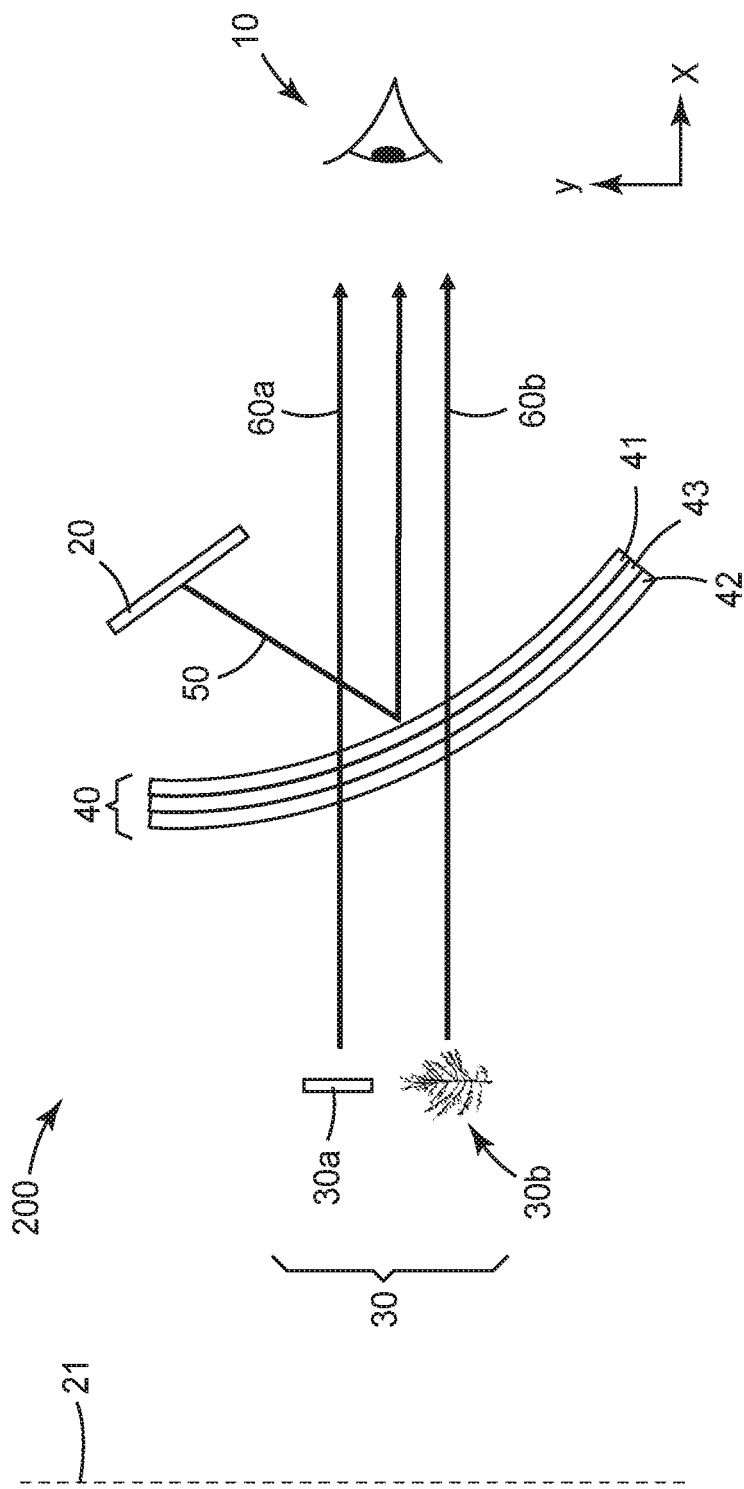
FIG. 1 is a schematic diagram of an optic system according to certain aspects of the disclosure.
Figure 2:
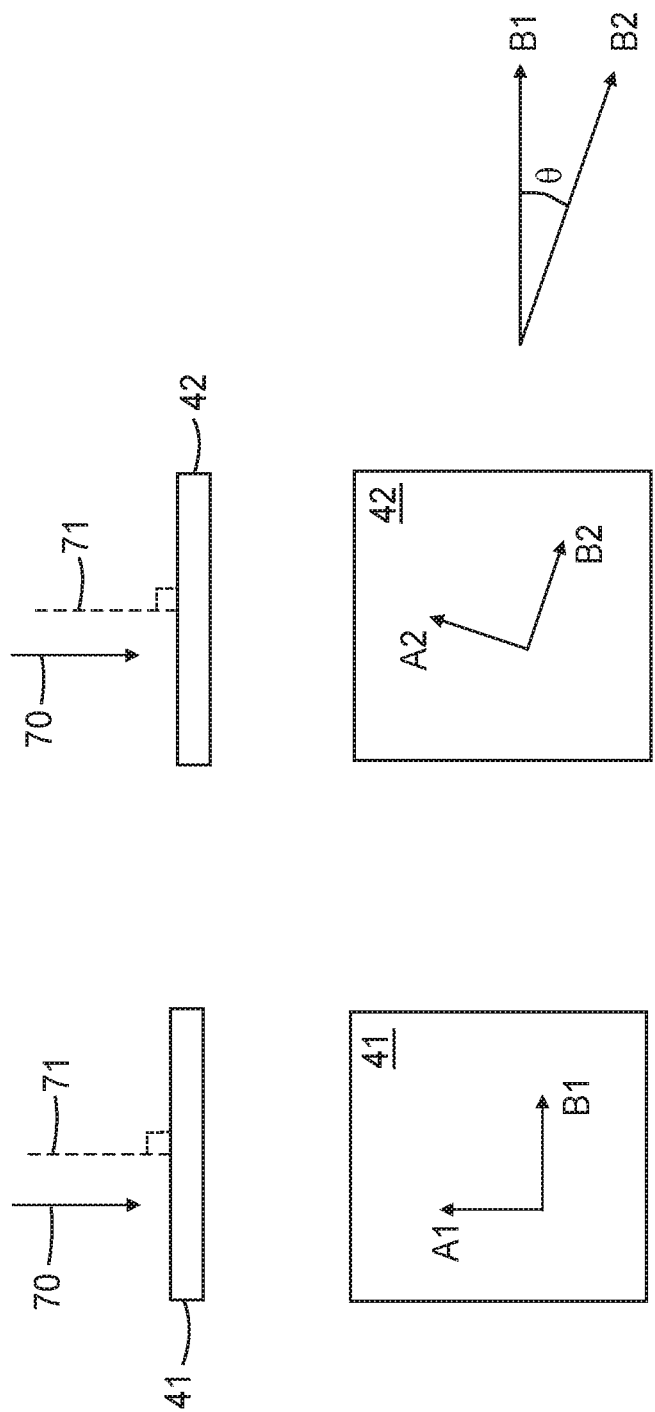
FIG. 2 a schematic representation of the angular orientation of light passing through various axes of the reflective and absorbing polarizers according to certain embodiments.

As shown schematically in FIGS. 1 and 2, an optical system (200) for displaying first and second images to a viewer (10) includes different first (20) and second (30) displays. In some embodiments, the first display (20) may be an electronic display. In some other embodiments, the second display (30) may be an electronic display (30a), where the electronic display (30a) may emit polarized light. In some aspects, the electronic display (20, 30a) includes one or more of a liquid crystal display (LCD), and an organic light emitting diode (OLED) display. In some embodiments, the electronic display may be substantially flat or planar as illustrated, or may be curved, or may include a plurality of flat or planar panels disposed at obtuse angles relative to one another. The electronic display (30a) may be a billboard, or the like. In some other aspects, the second display (30) is a real-world object (30b) in a real-world scene.

The optical system (200) includes an optical stack (40). In some embodiments, the optical stack (40) is curved. The optical stack (40) is configured to receive a first light ray (50) from the first display (20) and reflect the received first light ray (50) for viewing by the viewer. The optical stack is further configured to receive a second light ray (60a, 60b), different than the first light ray (50), from the second display (30) and transmit the received second light ray (60a, 60b) for viewing by the viewer.

In some embodiments the optical stack includes a reflective polarizer (41) facing the first display (20), and an absorbing polarizer (42) disposed on the reflective polarizer (41) and facing the second display (30). The absorbing polarizer may be attached to the reflective polarizer via an adhesive layer (43), such as an optically clear adhesive, or the like. The reflective polarizer (41) may be a wide-band reflective polarizer or a notch reflective polarizer. In some embodiments, the reflective polarizer (41) may be a high contrast reflective polarizer. In some embodiments the reflective polarizer (41) may include one or more of a wire grid reflective polarizer, and a multilayer polymeric reflective polarizer. In other embodiments, the reflective polarizer (41) may be a multilayer optical film polarizer.

The reflective polarizer (41) has orthogonal pass axis (A1) and block axis (B1). The absorbing polarizer (42) has orthogonal pass axis (A2) and block axis (B2). In some embodiments, for substantially normally incident light having a wavelength in a range from about 400 nm to about 700 nm, the reflective polarizer (41) reflects at least 70% of the incident light polarized along the block axis (B1) of the reflective polarizer (41), and transmits at least 70% of the incident light polarized along the pass axis (A1) of the reflective polarizer (41). The absorbing polarizer (42) absorbs at least 50% and at most 85% of the incident light polarized along the block axis (B2) of the absorbing polarizer (42), and transmits at least 70% of the incident light polarized along the pass axis (A2) of the absorbing polarizer (42). In some embodiments, the absorbing polarizer absorbs at least 60% and at most 85% of the incident light polarized along the block axis (B2) of the absorbing polarizer. In some other embodiments, the absorbing polarizer absorbs at least 60% and at most 80% of the incident light polarized along the block axis (B2) of the absorbing polarizer. In some other embodiments, the absorbing polarizer absorbs at least 70% and at most 85% of the incident light polarized along the block axis (B2) of the absorbing polarizer. In other embodiments, the absorbing polarizer absorbs at least 70% and at most 80% of the incident light polarized along the block axis (B2) of the absorbing polarizer.

Figure 3:
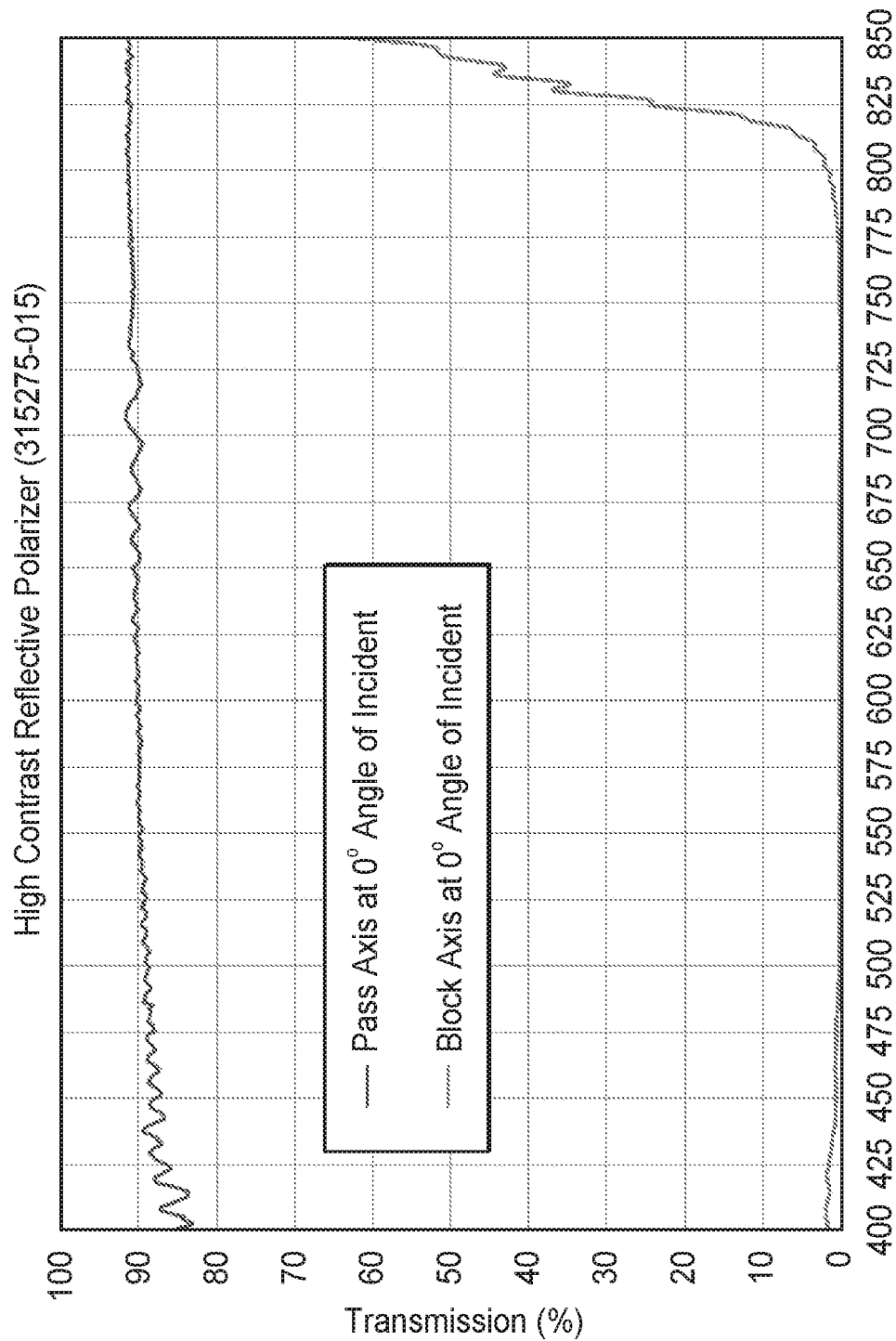
FIG. 3 is a graph showing the transmittance in an optic system having a reflective polarizer.

For instance, as graphically represented in FIG. 3, for substantially normally incident light having a wavelength in a range from about 400 nm to about 700 nm, the transmittance in an optic system having a multilayer optical film, such as a high contrast two-packet reflective polarizer, is about 85% to 90% in the pass axis and very little to no transmission in the block axis.

Figure 4:
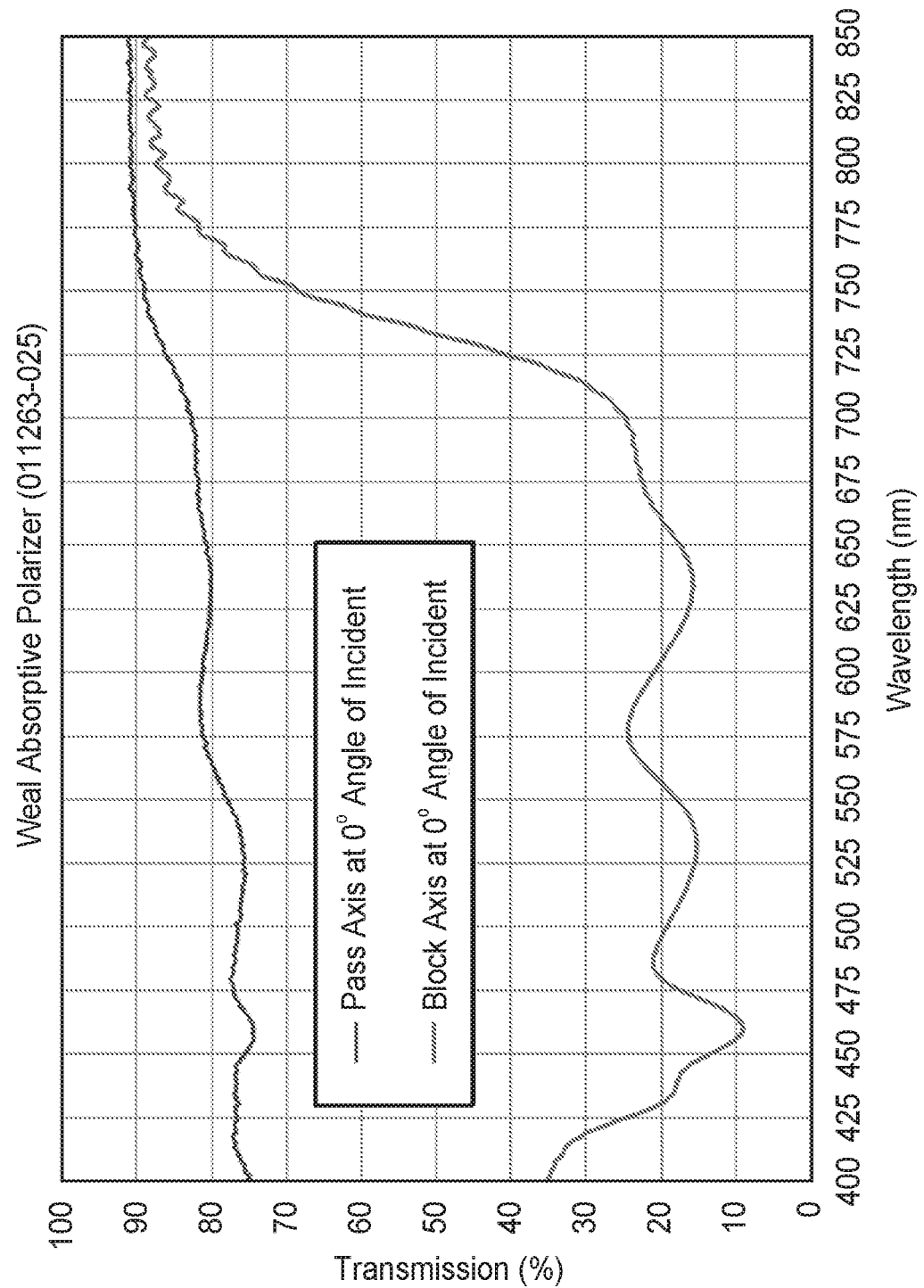
FIG. 4 is a graph showing the transmittance in an optic system having an absorptive polarizer.

In another instance, as graphically represented in FIG. 4, for substantially normally incident light having a wavelength in a range from about 400 nm to about 700 nm, the transmittance in an optical system having a weak absorptive polarizer is about 75% to about 85% in the pass axis and around 10% to 35% in the block axis.

In some aspects, the block axes (B1, B2) of the reflective and absorbing polarizers (41, 42) make an angle (bias) (θ) with each other. The angle (θ) may be between about 5 degrees to about 40 degrees. In some embodiments, the angle (θ) between the block axes (B1, B2) of the reflective and absorbing polarizers (41, 42) may be between about 10 degrees to about 30 degrees, or between 15 degrees to 25 degrees.

Figure 5:
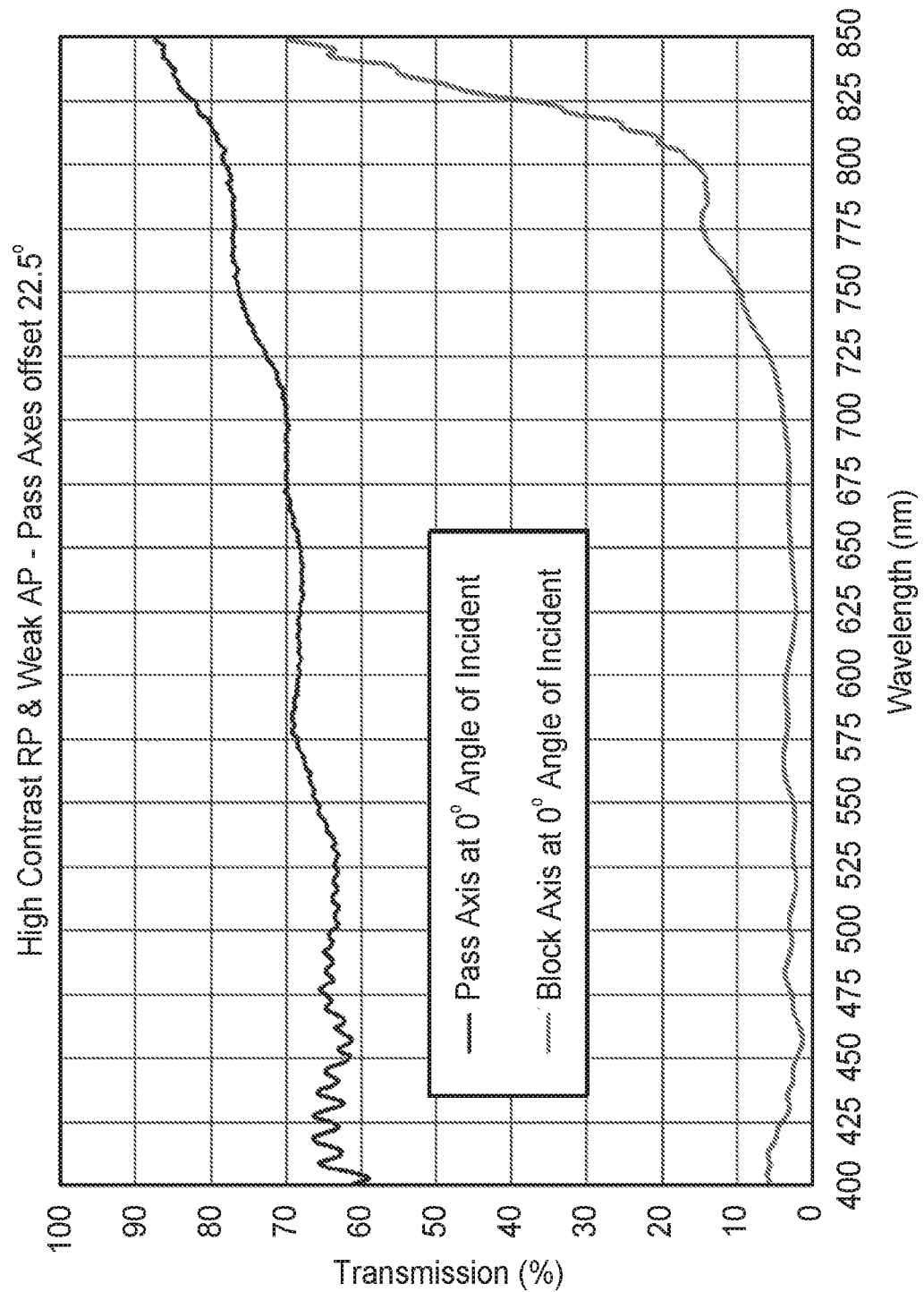
FIG. 5 is a graph showing the transmittance in an optic system having a combination of a reflective polarizer and an absorptive polarizer.

For example, FIG. 5 shows transmittance in an optical system having a combination of a reflective polarizer and a weak absorptive polarizer, where the angle (θ) between the block axes (B1, B2) of the reflective and absorptive polarizers is about 22.5 degrees. For substantially normally incident light having a wavelength in a range from about 400 nm to about 700 nm, the absorptive polarizer transmits about 5% of the incident light polarized along the block axis of the absorbing polarizer. Such a transmission in the block axis may be sufficient to allow the viewer to see, for instance, the second display (30a) emitting polarized light.

Another embodiment of the disclosure relates to a see-through optical system (200) for displaying a virtual image (21) to a viewer (10). The system includes a first display (20) configured to emit a first image (50) having a first polarization state (x), and an optical stack (40) curved along two mutually orthogonal directions (x, y). The eye lens of the viewer (10) together with the optical stack (40) forms the magnified virtual image (21) of the image (50) emitted by the first display (20).

The optical stack (40) is configured to receive the emitted first image (50) and reflect the received first image (50) for viewing by the viewer (10). The viewer observes a magnified virtual image (21) of the first image (20) and is able to receive and see a polarized real-world object (30a) in a real-world scene through the optical stack (40). In some aspects, for light (70) having at least one wavelength in a predetermined wavelength range and propagating along a substantially normal incident direction (71), the optical stack (40) reflects at least 70% of the incident light polarized along the first polarization state, and absorbs at least 50% and at most 85% of the incident light having an orthogonal second polarization state (y). The polarized real-world object (30a) remains viewable by the viewer as the optical stack (40) is continuously rotated at least 180 degrees about light (60a) incident on the optical stack (40) from the polarized real-world object (30a).

In some aspects, the optical stack (40) of the see-through optical system (200) includes a reflective polarizer (41) facing the first display, and an absorbing polarizer (42) disposed on the reflective polarizer (41) and facing the polarized real-world object (30a). Each of the reflective and absorbing polarizers (41, 42) has orthogonal pass (A1, A2) and block (B1, B2) axes. The block axis (B1) of the reflective polarizer (41) may be oriented along the first polarization state.

For substantially normally incident light having a wavelength in the predetermined wavelength range the reflective polarizer (41) reflects at least 70% of the incident light polarized along the block axis (B1) of the reflective polarizer, and transmits at least 70% of the incident light polarized along the pass axis (A1) of the reflective polarizer (41). The absorbing polarizer (42) absorbs at least 50% and at most 85% of the incident light polarized along the block axis (B2) of the absorbing polarizer, and transmits at least 70% of the incident light polarized along the pass axis (A2) of the absorbing polarizer. The block axes (B1, B2) of the reflective and absorbing polarizers (41, 42) make an angle (θ) with each other. The angle (θ) may be between about 5 degrees to about 40 degrees. In some embodiments, the angle (θ) between the block axes (B1, B2) of the reflective and absorbing polarizers (41, 42) may be between about 10 degrees to about 30 degrees, or between 15 degrees to 25 degrees.

In some aspects, the predetermined wavelength range is from about 400 nm to about 700 nm. In some aspects, the predetermined wavelength range may be a blue wavelength range, or a green wavelength range, or a red wavelength range. The at least one wavelength may include at least one blue wavelength, at least one green wavelength, and at least one red wavelength.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific Embodiments shown and described without departing from the scope of the present disclosure. This application is intended to cover any adaptations or variations of the specific Embodiments discussed herein. Therefore, it is intended that this disclosure be limited only by the claims and the equivalents thereof.

The invention claimed is:

1. An optical system for displaying first and second images to a viewer, comprising:
   different first and second displays; and
   an optical stack configured to receive:
      a first light ray from the first display and reflect the received first light ray for viewing by the viewer; and
      a second light ray, different than the first light ray, from the second display and transmit the received second light ray for viewing by the viewer, wherein, the optical stack comprises:
      a reflective polarizer facing the first display; and
      an absorbing polarizer disposed on the reflective polarizer and facing the second display, each of the reflective and absorbing polarizers comprising orthogonal pass and block axes, such that for substantially normally incident light having a wavelength in a range from about 400 nm to about 700 nm:
      the reflective polarizer reflects at least 70% of the incident light polarized along the block axis of the reflective polarizer, and transmits at least 70% of the incident light polarized along the pass axis of the reflective polarizer; and
      the absorbing polarizer absorbs at least 50% and at most 85% of the incident light polarized along the block axis of the absorbing polarizer, and transmits at least 70% of the incident light polarized along the pass axis of the absorbing polarizer, wherein the block axes of the reflective and absorbing polarizers make an angle with each other between about 5 degrees to about 40 degrees.

2. The optical system of claim 1, wherein the second display is a real-world object in a real-world scene.

3. The optical system of claim 1, wherein the reflective polarizer comprises one or more of a wire grid reflective polarizer, and a multilayer polymeric reflective polarizer.

4. The optical system of claim 1, wherein the angle between the block axes of the reflective and absorbing polarizers is between about 10 degrees to about 30 degrees.

5. The optical system of claim 1, wherein the absorptive polarizer transmits about 5% of the incident light polarized along the block axis of the absorbing polarizer.

6. The optical system of claim 1, wherein the second display is an electronic display and emits polarized light.

7. The optical system of claim 1, wherein the absorbing polarizer is attached to the reflective polarizer via an adhesive layer.

8. The optical system of claim 1, wherein the absorbing polarizer absorbs at least 70% and at most 80% of the incident light polarized along the block axis of the absorbing polarizer.

9. A see-through optical system for displaying a virtual image to a viewer, comprising:
   a first display configured to emit a first image having a first polarization state; and
   an optical stack curved along two mutually orthogonal directions and configured to receive the emitted first image and reflect the received first image for viewing by the viewer, the viewer observing a magnified virtual image of the first image, the viewer able to receive and see a polarized real-world object in a real-world scene through the optical stack, such that for light having at least one wavelength in a predetermined wavelength range and propagating along a substantially normal incident direction, the optical stack:
      reflects at least 70% of the incident light polarized along the first polarization state; and
      absorbs at least 50% and at most 85% of the incident light having an orthogonal second polarization state,
   wherein the polarized real-world object remains viewable by the viewer as the optical stack is continuously rotated at least 180 degrees about light incident on the optical stack from the polarized real-world object.

10. The see-through optical system of claim 9, wherein the predetermined wavelength range is from about 400 nm to about 700 nm.

11. The see-through optical system of claim 9, wherein the predetermined wavelength range is a blue wavelength range.

12. The see-through optical system of claim 9, wherein the at least one wavelength comprises at least one blue wavelength, at least one green wavelength, and at least one red wavelength.

13. The see-through optical system of claim 9, wherein the optical stack comprises:
- a reflective polarizer facing the first display; and
- an absorbing polarizer disposed on the reflective polarizer and facing the polarized real-world object, each of the reflective and absorbing polarizers comprising orthogonal pass and block axes, such that for substantially normally incident light having a wavelength in the predetermined wavelength range:
  - the reflective polarizer reflects at least 70% of the incident light polarized along the block axis of the reflective polarizer, and transmits at least 70% of the incident light polarized along the pass axis of the reflective polarizer; and
  - the absorbing polarizer absorbs at least 50% and at most 85% of the incident light polarized along the block axis of the absorbing polarizer, and transmits at least 70% of the incident light polarized along the pass axis of the absorbing polarizer,
- wherein the block axes of the reflective and absorbing polarizers make an angle with each other between about 5 degrees to about 40 degrees, and
- wherein the block axis of the reflective polarizer is oriented along the first polarization state.

14. The see-through optical system of claim 9, wherein the predetermined wavelength range is a green wavelength range.

15. The see-through optical system of claim 9, wherein the predetermined wavelength range is a red wavelength range.

* * * * *